United States Patent [19]

Dulaff et al.

[11] Patent Number: 4,873,592
[45] Date of Patent: Oct. 10, 1989

[54] PINCH ROLLER DRIVE ENGAGEMENT MECHANISM FOR A COMMUNICATIONS MONITOR AND LOGGER

[75] Inventors: Paul G. Dulaff, Fairfield; C. Eugene McGraw, Norwalk, both of Conn.

[73] Assignee: Dictaphone Corporation, Stratford, Conn.

[21] Appl. No.: 97,905

[22] Filed: Sep. 17, 1987

[51] Int. Cl.$^4$ .............................................. G11B 15/00
[52] U.S. Cl. ...................................... 360/90; 360/96.2; 360/96.4
[58] Field of Search ................... 360/96.2, 96.3, 96.4, 360/93, 90

[56] References Cited

U.S. PATENT DOCUMENTS

| | | | |
|---|---|---|---|
| 3,838,459 | 9/1974 | Bettini et al. | 360/96.2 |
| 4,384,308 | 5/1983 | Yanagida | 360/8 |
| 4,542,427 | 9/1983 | Nagai | 360/72.1 |
| 4,570,190 | 2/1986 | Kitoh | 360/73 |
| 4,571,644 | 2/1986 | Fukuda | 360/96.4 |
| 4,580,179 | 4/1986 | Sakaguchi et al. | 360/69 |
| 4,583,139 | 4/1986 | Saito | 360/96.2 |
| 4,589,039 | 5/1986 | Sugihara | 360/96.2 |

FOREIGN PATENT DOCUMENTS

| | | | |
|---|---|---|---|
| 53-132311 | 11/1978 | Japan | 360/96.2 |
| 58-177547 | 10/1983 | Japan | 360/96.2 |
| 59-127251 | 7/1984 | Japan | 360/96.2 |

*Primary Examiner*—John H. Wolff
*Assistant Examiner*—Matthew J. Bussan
*Attorney, Agent, or Firm*—Robert H. Whisker; Melvin J. Scolnick; David E. Pitchenik

[57] ABSTRACT

The communications monitor and logger preferably uses reel-to-reel tape recorders to continuously record communications over multiple channels such as multiple telephone lines. Each tape recorder uses a pair of capstans and pinch rollers to move the tape during recording and play-back. The pinch rollers are engaged with the capstans by means of a solenoid through a linkage and spring coupling. The spring is stretched by the solenoid only after the pinch roller makes contact with the capstan, thus reducing the force required from the solenoid. The spring is pre-loaded so as to improve the accuracy with which the force applied to the pinch roller is determined. The solenoid is used to apply force to the spring only when the solenoid plunger approaches its seat, so as to make the most efficient use of the solenoid and minimize its size and electrical power usage. Individually adjustable brakes are provided for each of two tape reels, thus permitting individual adjustments to compensate for different characteristics of the brakes. The interior of the cabinet for the monitor and logger unit preferably is maintained at a pressure above ambient by a blower in order to keep out contaminants and reduce drop-outs. Air filters and sound-insulation are used for the dual purpose of keeping contaminants out and reducing noise emissions from the blower.

5 Claims, 6 Drawing Sheets

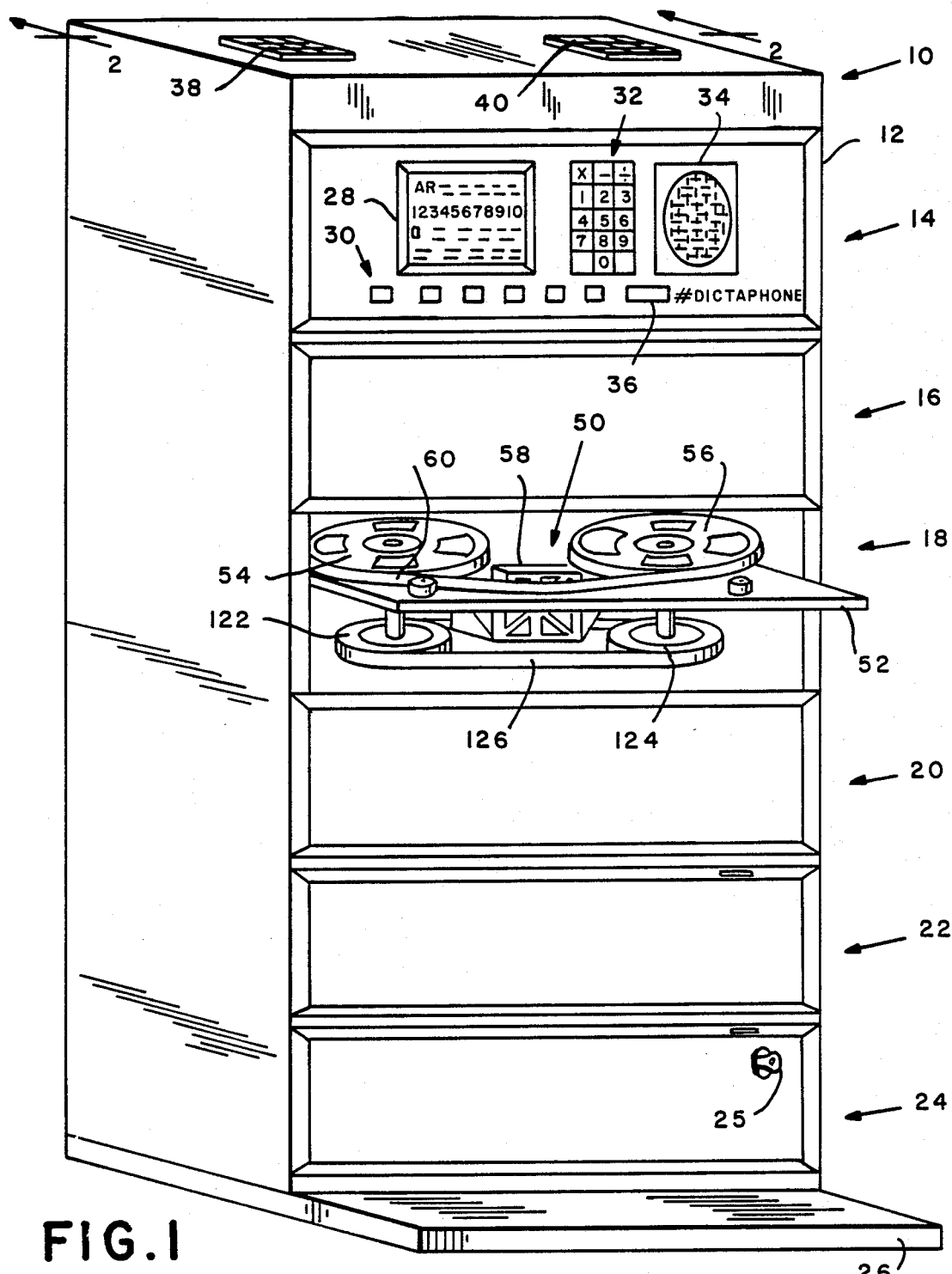
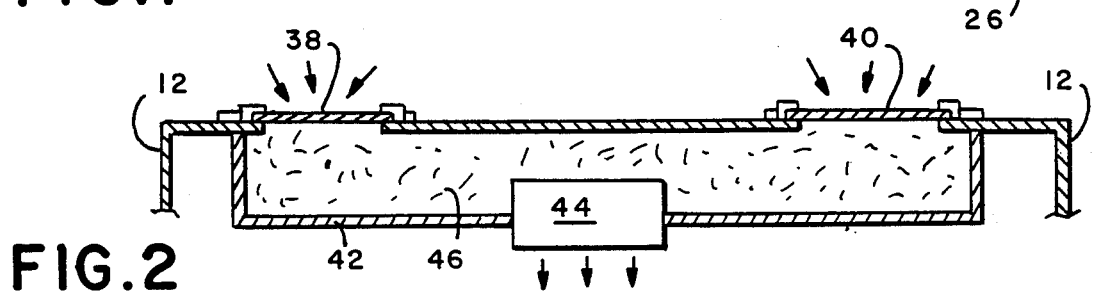
FIG.1
FIG.2

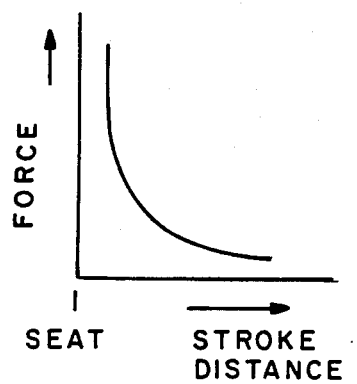
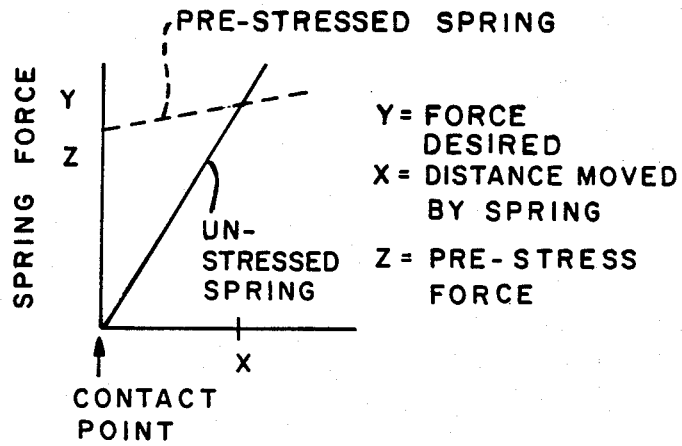
FIG. 8  FIG. 9
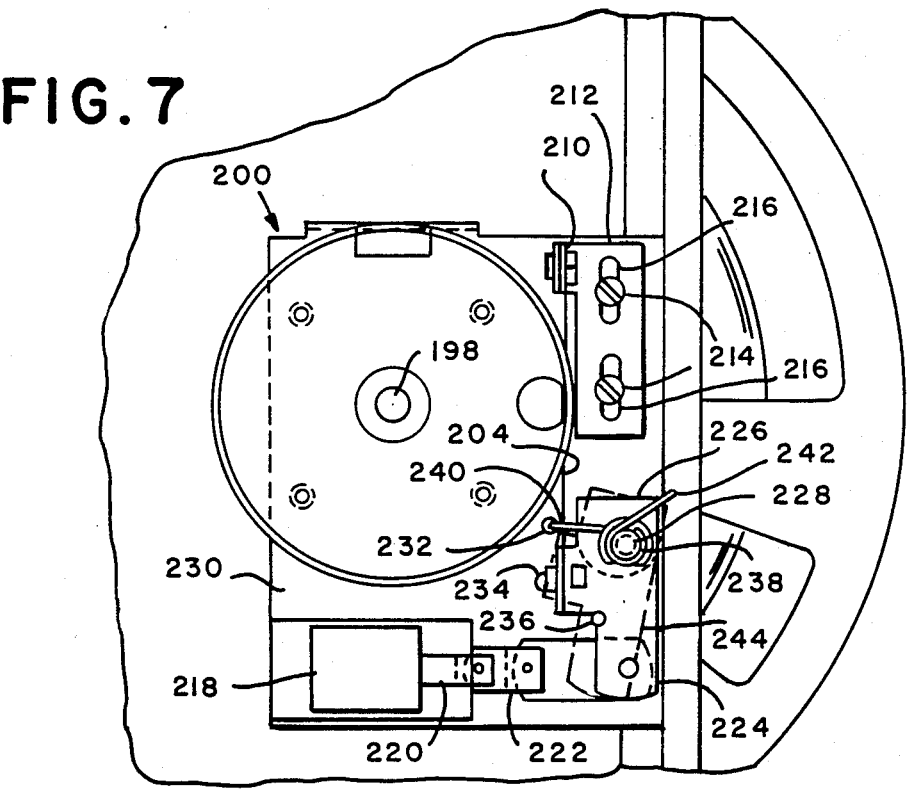
FIG. 7

PINCH ROLLER DRIVE ENGAGEMENT MECHANISM FOR A COMMUNICATIONS MONITOR AND LOGGER

This invention relates to communications monitoring and "logging" equipment; more particularly, this invention relates to magnetic tape recorders and reproducers used in such equipment or for recording ("logging") all communications received or sent through many different communications channels over substantial periods of time.

Communications loggers typically are used to make continuous or nearly continuous recordings of all telephone communications to or from a single location, such a police station or fire station. Typically, the loggers are multi-channel magnetic tape recorders which record the communications from each of a substantial number of telephone lines, e.g., up to 60 or more, in closely spaced parallel tracks on the magnetic tape.

Because recording often takes place continuously, twenty four hours per day, the recording speed should be very slow. Typically, the recording speed is less than one half of an inch per second. However, because of the great length of tape required despite the slow recording speed, the fast forward and reverse speeds preferably are high so as to minimize rewinding time and the time required to reach selected areas of the tape records.

Several problems are caused by the rather special requirements set forth above. One problem is that, because the tape recorder is running essentially continuously, power usage and drain by the logger device can become excessive, especially if it is desired to operate the device from batteries. Furthermore, the size and cost of the power supply, solenoids and other components of the device can be excessive.

Another problem with some prior loggers is that the braking system for slowing and stopping the tape reels after fast winding operations tend to be difficult to adjust to give fastest, smoothest, and most trouble free operation. In a typical prior braking system, a single brake strap or band encircles two brake drums, one connected to each of two tape reels. A single spring is used to tighten the band around the drums and thus actuate the brake. This prior brake is difficult to adjust if one of the brake drums wears differently from the other. This can result in the formation of loose sections or "loops" in the tape, or can compel an adjustment which is an unsatisfactory compromise between the different adjustments needed by each individual brake.

A further problem with such communications loggers is that contaminants entering the cabinet in which the magnetic tape recorders are located easily can cause "drop-outs" or loss of signals on the tapes, due to the fact that the recording tracks are very narrow and closely spaced on the tape. Therefore, it has been customary to provide a blower or fan which maintains a higher air pressure inside of the cabinet than outside, so as to tend to repel the contaminants. However, little or nothing has been done to purify the air entering the cabinet, and this remains as a source of contamination. Moreover, the blower sometimes is noisy thus creates a noisy environment for nearby workers.

Another problem arises in certain prior art devices with multiple tape drive capstans and pinch rollers in which the mechanisms for engaging the pinch rollers against the capstans are directly linked together. Such prior mechanisms tend to accentuate the "wow" and/or "flutter" caused by eccentricities of the pinch rollers.

Accordingly, it is an object of the invention to provide a communications monitor and logger which eliminates or alleviates the foregoing problems. More specifically, it is an object to provide such a device which has relatively low operational electrical power requirements, and is more compact and less expensive to manufacture than prior logger devices.

It is another object of the invention to provide such a device having tape reel braking means which stops the high-speed tape reel motion quickly and accurately, and in which individually adjustable brake devices are provided which can be adjusted relatively easily to compensate for their different wear rates, and in order to accommodate varying loads due to varying tape size, etc.

It is a further object of the invention to provide such a device in which the enclosure in which the tape recorder is located is more resistant to the entry of contaminants so as to minimize recording drop-outs. It is a further object to provide such a device in which noise emissions are minimized.

In accordance with the present invention, the foregoing objects are met by the provision of a communications tape recorder and reproducing device, particularly a logger, with at least one tape drive capstan and a pinch roller. The pinch roller is movable towards and away from the capstan by a pinch roller engagement mechanism having resilient coupling means such as a spring and a linkage. Preferably, this coupling means is operated by a solenoid. The spring is pre-loaded and need not be loaded by the solenoid to apply force to the pinch roller until the roller reaches the capstan, thus minimizing the work required from the solenoid to engage the roller with the capstan and apply to it a pre-determined force.

In accordance with another feature of the invention, the force required from the solenoid is minimized until the plunger of the solenoid nears its innermost position, in which it supplies the most force for a given electrical input. This maximizes the force provided by the solenoid and minimizes its usage of electrical power.

In another feature of the invention, individually adjustable brakes are provided for each of two tape reels. Preferably, each brake includes a brake drum and a strap wrapped around it, with spring-operated band-tightening means which can be individually adjusted to provide the best braking characteristics for each reel, and to adjust for varying loads such as those provided by varying sizes of tape.

In a further feature of the invention, the cabinet for the logger unit preferably is nearly air tight, and a blower maintains in the cabinet an air pressure which is slightly higher than ambient, so as to keep out contaminants which otherwise might cause drop-outs in the closely-spaced recording tracks on the magnetic tape. At least one, and preferably a plurality of the air inlets are provided with replaceable air filters. Also, a compartment containing sound-deadening material is located between the blower and the inlet or inlets so as to reduce noise emissions and further filter the air entering the cabinet.

Preferably, two capstans and pinch rollers are used. "Wow" and "flutter" due to eccentricities of the pinch rollers are minimized by providing independent resilient means for urging the pinch rollers against the capstans. Such independent means prevents or minimizes the transmission of the effects of eccentricities of one of the pinch rollers to the other.

The foregoing and other objects and advantages of the invention will be set forth in or apparent from the description and following drawings. In the drawings:

Figure a perspective view of a communications monitor and logger constructed in accordance with the present invention;

FIG. 2 is a cross-sectional view of a portion of the device shown in FIG. 1 taken along line 2—2 of FIG. 1;

FIG. 7 is a side elevation view of another portion of the tape deck shown in FIG. 3;

FIG. 8 is a graph illustrating the principle of operation of a solenoid used in the device shown in FIGS. 3 through 6; and FIG. 9 is another graph illustrating an operational principle of the device shown in FIGS. 3 through 6.

GENERAL DESCRIPTION

Figure 3:
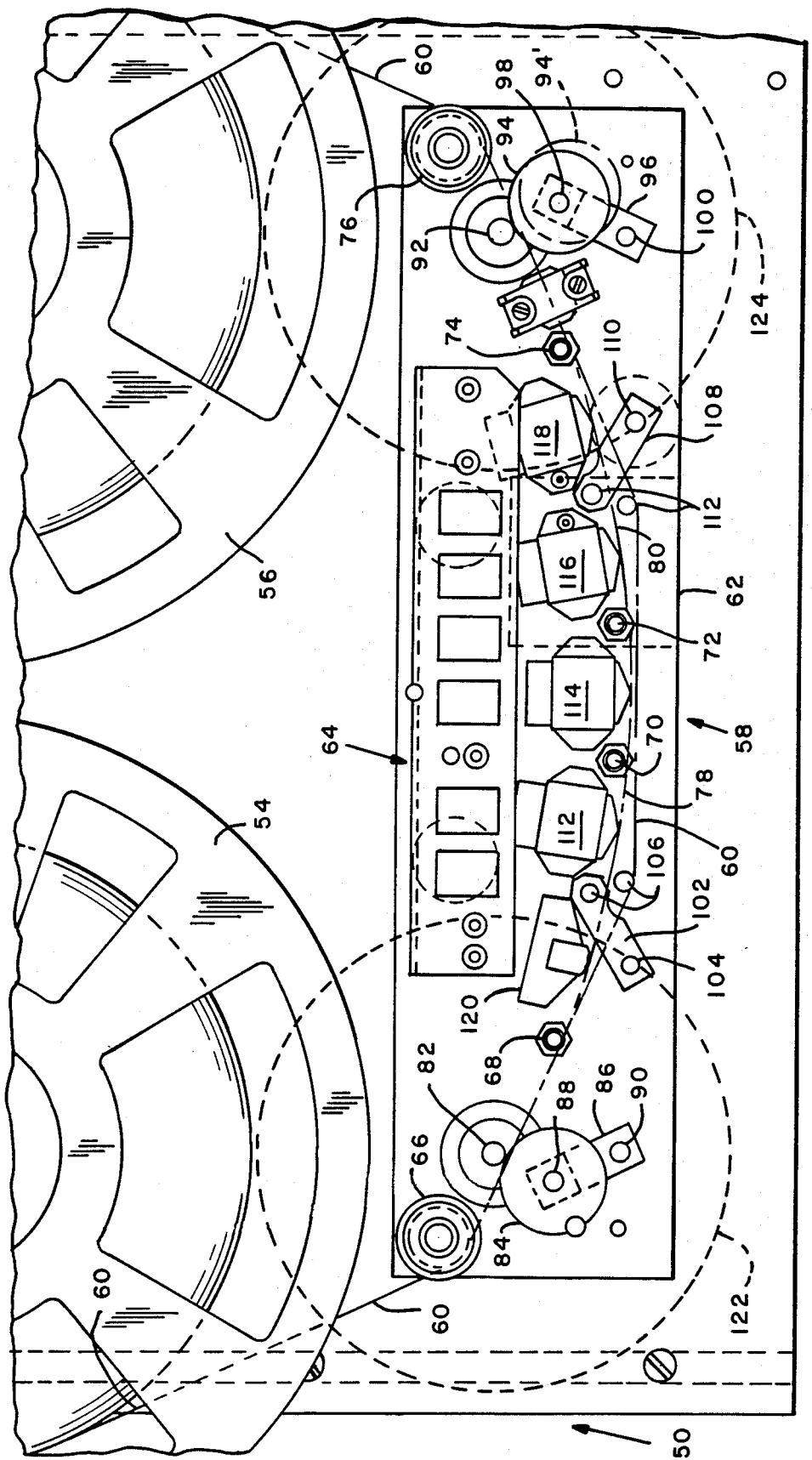
FIG. 3 is a top plan view of a portion of a tape deck used in the device shown in FIG. 1.

FIG. 1 shows a communications monitor and logger unit 10 constructed in accordance with the present invention. The unit 10 includes a cabinet 12 resting on a base 26, and a plurality of different sections or "bays" 14, 16, 18, 20, 22, and 24, in which are mounted separate modules which are combined to create the logger device. Each bay has a removable cover over it, except for the bay 18, whose cover has been removed in order to illustrate its contents.

The uppermost bay 14 contains a controller which provides for the control of the logger, with the aid of a video monitor screen 28, a plurality of push button controls 30, a key pad 32, a loud speaker 34, and a control 36. The function of these controls is explained more fully in co-pending U.S. patent application Ser. No. 097,899, for: Modular Configurable Communications Recorder and will not be explained in detail here. However, the controller module includes microprocessor and other circuitry for controlling the operation of the logger, for displaying on the monitor screen 28 the status of each of many different channels in which communications signals are recorded by the unit 10, and for reproducing selected portions of recorded conversations or information by means of the loud speaker 34.

The second bay 16 from the top is an option bay to contain additional tape decks or other equipment if needed. The user thus can expand the capacity and/or capabilities of the logger simply by adding another module in the bay 16.

The bay 18 contains a tape deck 50. The front panel of the bay 18 has been removed to show the tape deck, which has been moved out on slides (not shown) to give access to the tape deck equipment.

The next bay 20 contains an optional second tape deck. If desired, for example, the first tape deck 50 can use relatively narrow magnetic tape, and the unit 20 can use relatively wider tape so as to record communications from many more channels than the tape deck 50.

The next bay contains recording amplifier equipment, and the bottom bay 24 contains the power supply for the logger 10. A key-operated on/off switch 25 is provided to enable the user of the logger to limit those who are able to turn the logger on and off. This tends to prevent unwanted disablement of the logger.

Still referring to FIG. 1, the tape deck 50 includes a base plate 52, two tape reels 54 and 56, a plurality of recording/reproducing heads 58, and magnetic tape 60. Two flywheels 122 and 124 are joined by a drive belt 126. The flywheel 122 and 124 drive the capstans which move the magnetic tape past the heads for recording and reproducing.

In operation, a plurality of communications lines such as telephone lines are connected into the logger 10, by means not shown, and all incoming or outgoing calls on the lines are recorded on one of the tape decks in the unit 10. The tape decks typically run continuously or for long periods of time during each day so that they record all sounds transmitted over each of the telephone lines at all times or during a large portion of each day. This is valuable in providing a record of emergency calls and other valuable information which otherwise might be lost if it were not recorded.

Due to the fact that calls from many communications channels are recorded in very closely spaced tracks on a single magnetic tape, the tape recording and reproducing equipment must be highly accurate in order to keep the tape in proper alignment with the recording-/reproducing heads. The logger records and reproduces sound at a very slow speed, and yet is capable of rewinding and moving the tape in a fast-forward mode very rapidly, thus facilitating the rapid handling of the relatively large quantities of tape which usually are used.

ANTI-CONTAMINANT SYSTEM

Before discussing the tape deck features of the present invention, the system used to minimize the entrance of contaminants into the cabinet and the resulting "drop-outs" caused by such contaminants will be described.

Referring to FIG. 2, which is a cross-sectional view taken along line 2—2 of the top portion of the cabinet 12 shown in FIG. 1, a pair of inlet holes with replaceable filters 38 and 40 over them are provided at spaced locations in the top of the cabinet. An elongated container 42 is mounted inside the cabinet 10 in communication with both inlets 38 and 40. The container 42 forms a passageway between the two inlet openings. In the bottom wall of the container 42 is a fan or blower 44 which draws air out of the container 42 and forces it downwardly into the cabinet 12. The container 42 is filled with a noise-insulating material 46 such as an open-cell polyurethane acoustic foam sold by E.A.R. Corp. This material also provides some assistance to the filters 38 and 40 in filtering the air entering the unit.

The blower 44 creates a pressure inside the cabinet which is slightly higher than that outside of the cabinet, due to the fact that the cabinet 12 is made nearly airtight so that it permits only moderate leakage of air from the inside to the outside. The flow of air out of the small crevices in the cabinet 12 repels contaminants such as dust, tobacco smoke, etc, and thus minimizes the drop-out problem discussed above. The material 46 in the container 42 not only minimizes the noise emitted the fan or blower 44, but it also assists filters 38 and 40 in filtering the air and thus keeping the contaminants out of the cabinet.

TAPE DECK-GENERAL DESCRIPTION

Figure 4:
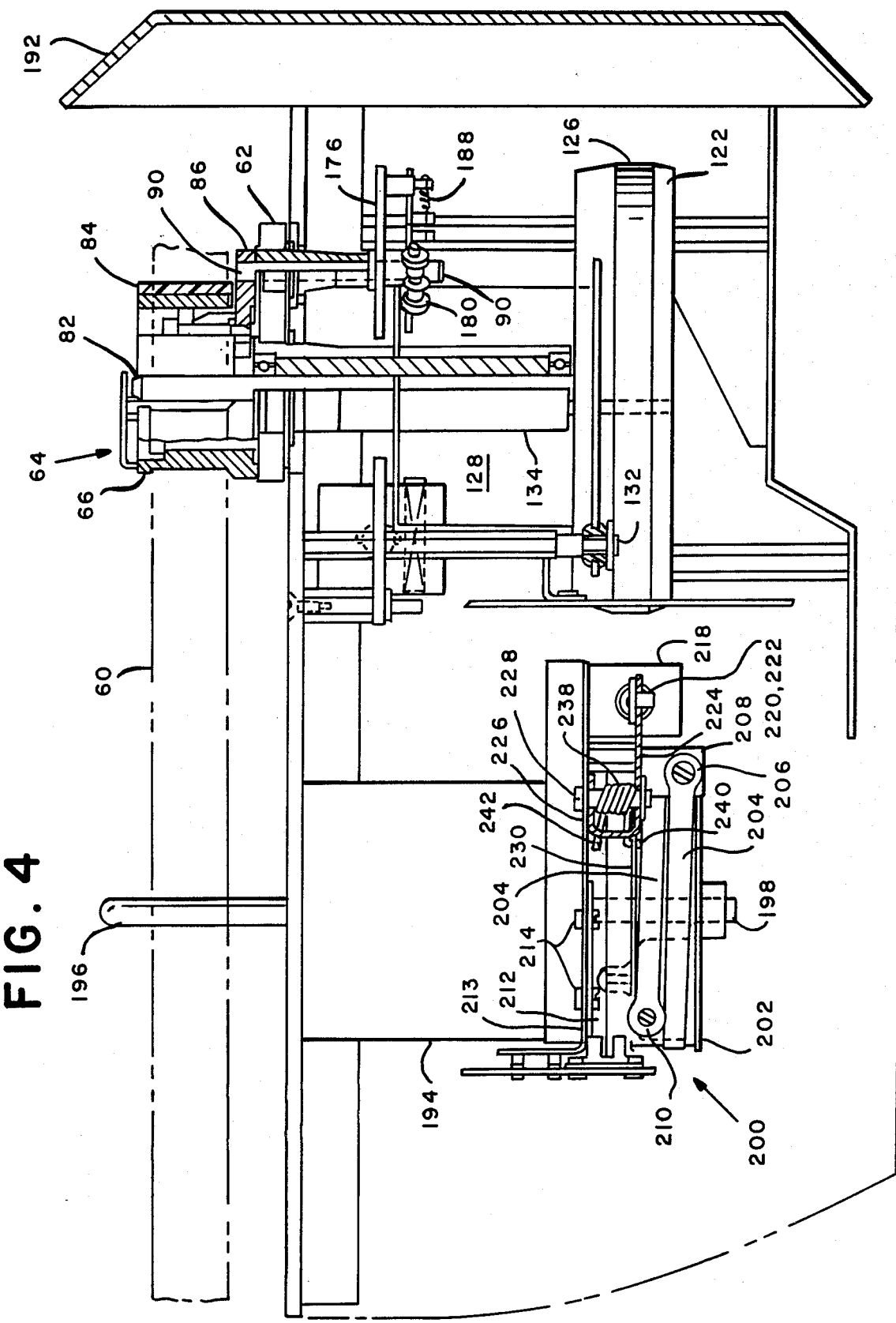
FIG. 4 is a partially schematic, partially cross-sectional left side elevation view of the tape deck shown in FIG. 3.
Figure 5:
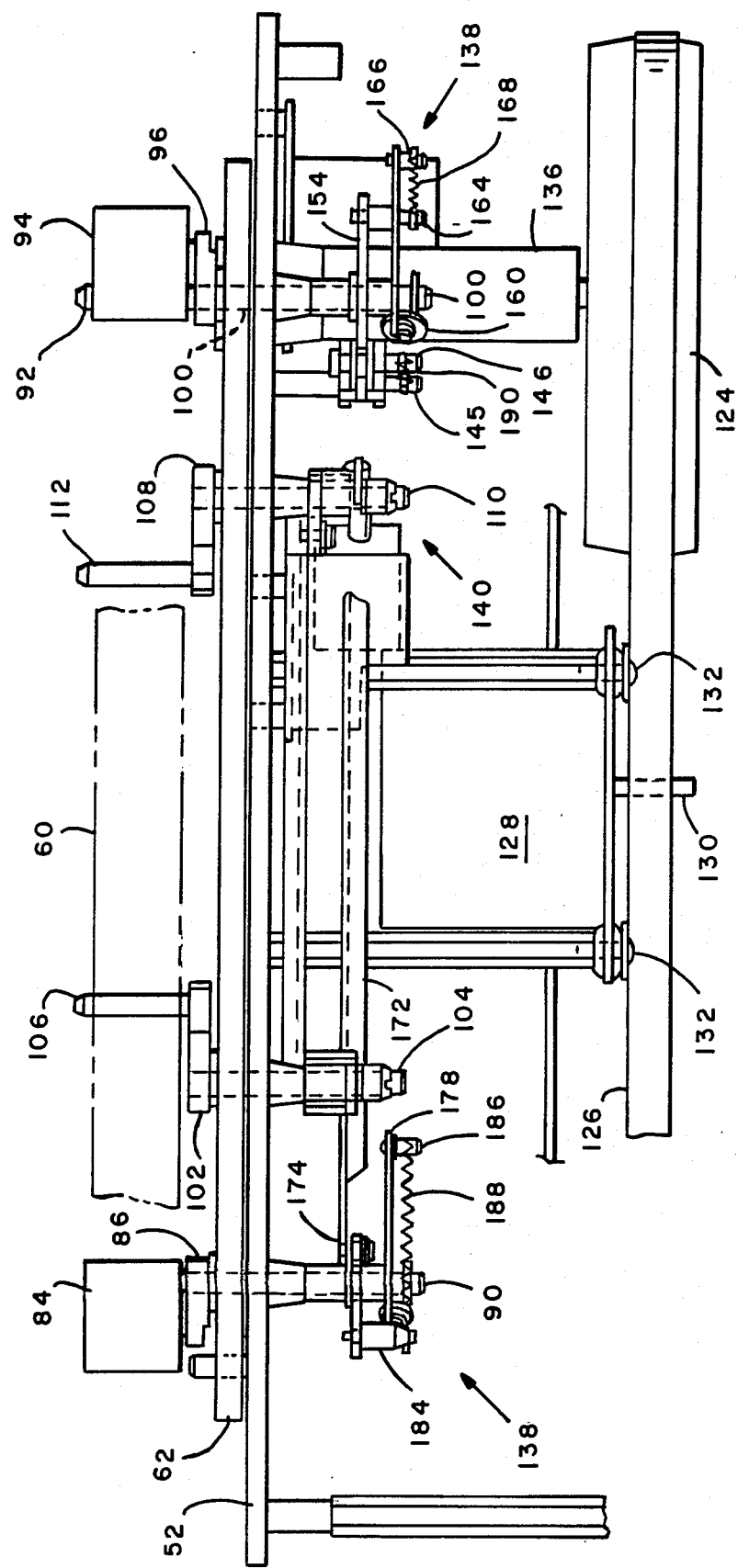
FIG. 5 is a front elevation view, partially broken away and partially schematic, of the tape deck shown in FIG. 3.
Figure 6:
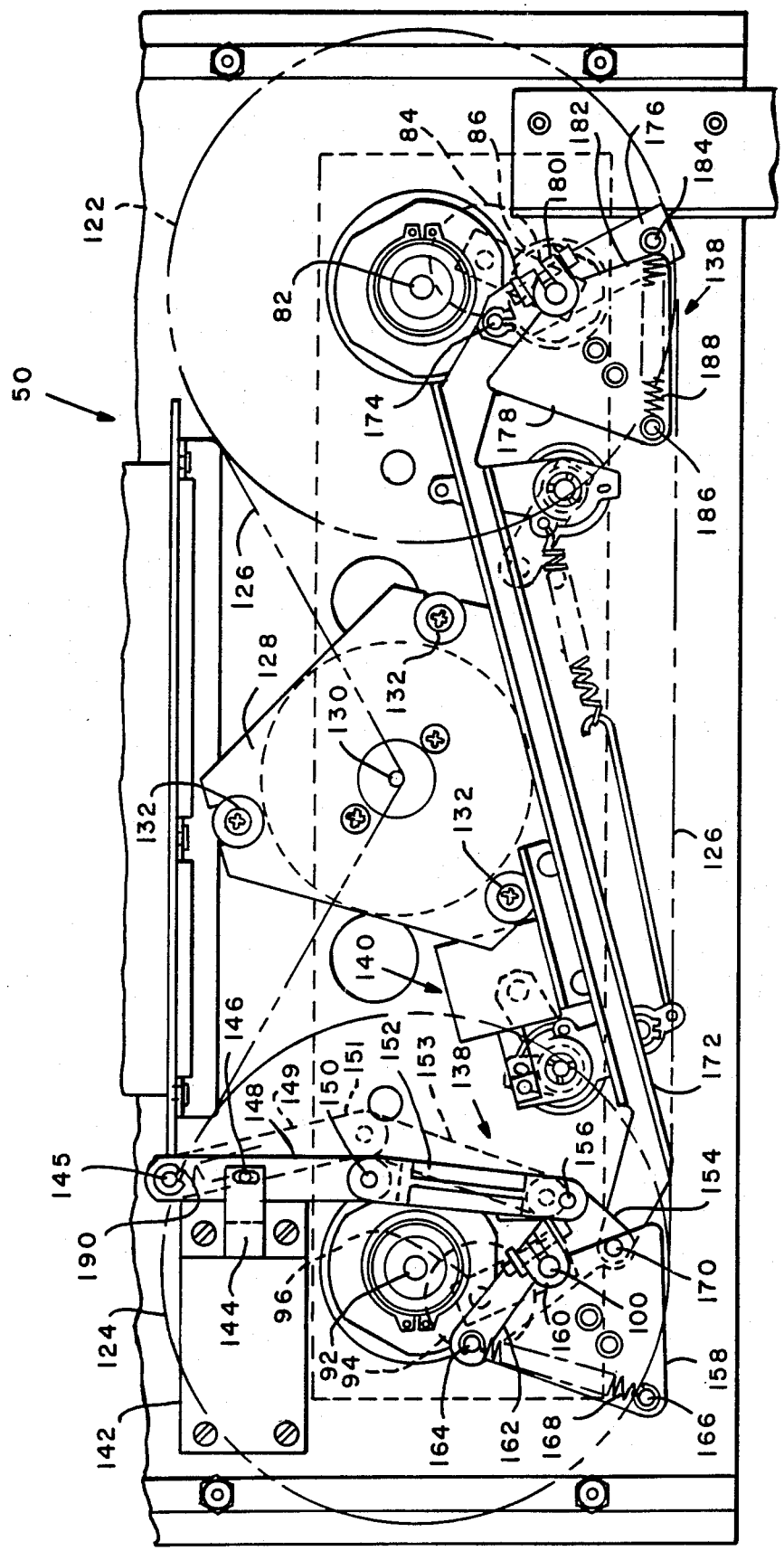
FIG. 6 is a bottom plan view of a portion of the tape deck shown in FIG. 3.

Now referring to FIG. 3, as well as FIGS. 4 through 6, the tape deck 50 includes a metal "head plate" 62 which is mounted on the base plate 52. The array 58 includes recording/reproducing heads 112, 114, 116, 118, and an erase head 120, all of which are mounted on the plate 62.

Also provided is a local control panel 64 with push buttons for local control of the tape deck.

The magnetic tape 60 is wound in a roll on the reel 54, and, during recording or play-back, passes from that reel over smooth guide posts 66, 68, 70, 72, 74, and 76, and then is wound on the second tape reel 56.

The magnetic tape 60 is driven for recording and play-back by a pair of capstans 82 and 92 which cooperate, respectively, with pinch rollers 84 and 94 to grip and move the tape smoothly across the surfaces of the record/reproduce heads. The record/reproduce heads are arranged in an arc. In the recording/reproducing mode, the tape 60 contacts the record/reproduce heads and thus also forms an arc, as indicated at 78 and 80. The tape guides 66, 68, etc, guide the tape in this pattern.

TAPE LIFTING MECHANISM

When it is desired to move the tape at high speed, two smooth tape-lifting guides 106 and 112 are pivoted on arms 102 and 108, respectively, on pivotably-mounted shafts 104 and 110, respectively, to "lift" or move the tape away from the recording/reproducing heads. The tape thus is moved to the position shown in dashed lines in FIG. 3. This greatly reduces wear on the recording heads by eliminating abrasion of the heads during high-speed tape motion.

Referring to FIG. 6, a mechanism 140 is used to advance and retract the tape-lifting arms 106 and 112. That mechanism forms no part of this invention and will not be described in detail. However, a single solenoid operates both arms through the various linkages shown in FIG. 6.

Preferably, the tape lifting mechanism just described operates only while the tape deck is operating in the high speed mode, which normally comprises a very small percentage of the total operating time of the logger device. Most of the time, the logger simply records sound appearing on various telephone lines. Therefore, as compared with prior loggers, the logger of the present invention uses less electrical power, thus facilitating battery operation if desired, and reducing the size and expense of the power supply required.

It should be understood that each of the record/reproduce heads 112, 114, 116, and 118 has closely-spaced parallel recording sections for separately recording and/or reproducing sound in very closely spaced tracks on the magnetic tape. For example, the tracks typically are spaced only twenty five thousandths of an inch from one another. This requires considerable precision in moving the tape. Otherwise, skew of the tape is likely to occur. The reproducing head corresponding to each recording head usually is spaced at considerable distance from the recording head. For example, in FIG. 3, the head 112 is a recording head, and head 116 is a reproducing head for use with the recording head 112. Similarly, recording head 114 and reproducing head 118 form a relatively widely-spaced pair. If the tape becomes even slightly skewed, the track recorded by the recording head will not be correctly aligned with the proper section of the reproducing head, and sound reproduction is impaired. Furthermore, the recording heads are relatively expensive. Thus, the use of the tape-lifting means during high-speed tape movement tends to maintain the quality of tape recording and reproduction, and reduces head replacement costs.

PINCH ROLLER ENGAGEMENT MECHANISM

As it has been explained above, the pinch rollers 84 and 94 can be retracted away from the capstans 82 and 92 in order to facilitate removal of the magnetic tape, or fast forward or reverse operation. In FIG. 3, the pinch roller 94 is shown in solid lines in the position in which it contacts the capstan 92. It is also shown retracted into the position 94, which is shown in dashed lines. The pinch roller 84 moves by a similar distance away from the capstan 82.

The mechanism for moving the pinch rollers 84 and 94 towards and away from the capstans is shown in FIGS. 4, 5, and 6.

FIG. 6 is a bottom plan view of the portion of the tape deck 50 shown in FIG. 3. The fly wheels 122 and 124 are shown in dashed outline only—as if they had been removed. Otherwise, the parts below them would not be visible.

Visible in FIG. 6 is a capstan drive motor 128 with a shaft 130 that engages the belt 126 and rotates both fly wheels 122 and 124 and the capstans 82 and 92. The motor 128 is mounted on the base plate 52 by means of three screws 132.

In the left hand portion of FIG. 6, the pinch roller 94, which is on the opposite side of the base plate 52, is shown in dashed outline, as is the arm 96 on which it is mounted. The pinch roller 94 is shown in contact with the capstan 92.

The pinch roller engagement mechanism is indicated at 138 in FIGS. 4, 5, and 6. Referring to FIG. 6, the motive power for advancing the pinch rollers is a solenoid 142 with a plunger 144. The plunger is pivotably connected at 146 to a first elongated link 148 which is pivoted to the base plate 52 at 145. The pivot point 146 is considerably closer to the pivot point 145 than it is to the opposite end of link 148.

The link 148 is pivotably connected at 150 to another elongated link 152 which is pivotably connected at 156 to one corner of a triangular crank member 154. The crank member 154 is rotatably mounted on the shaft 100 to which the pinch roller arm 96 is secured.

Also provided is a spring plate 158 which is secured to the shaft 100 by means of a clamp 160. The plate 158 is generally triangular in shape and has a pin 166 at one corner. The crank 154 also has a pin 164 extending beyond the rear surface of the spring plate 158 (see FIG. 5 as well as FIG. 6). A tension spring 168 is connected between the pins 164 and 166.

In accordance with one feature of the present invention, the spring 168 is pre-stressed or pre-loaded by stretching it between the two pins 164 and 166 during assembly of the actuating mechanism 138. This causes the pin 164 on the crank 154 to abut against one edge 162 of the spring plate so as to hold the spring plate and the crank together. Thus they move as a unit while the pinch roller is swinging from its fully disengaged position to a position in which it first makes contact with the capstan 92.

The linkage including links 148 and 152 is shown in FIG. 6 in solid lines in the position it assumes when the pinch roller 94 is fully pressed against the capstan 92. The same links are shown in dashed outline at 149 and 153 in the positions which they assume when the pinch roller is fully retracted away from the capstan 92.

Referring particularly to FIG. 6, the operation of the portion of the mechanism 138 described so far now will be explained. Assuming that the pinch roller 94 is fully retracted away from the capstan 92 and that the linkage is in the position shown in dashed lines, the plunger 144 of the solenoid 142 is in its most outwardly-extended position. As the solenoid is energized, the plunger pulls on the pivot 146 and moves the link 148, with considerable mechanical leverage, thus causing the linkage to straighten and extend its effective length. This causes point 156 to move downwardly, and causes the crank 154 to be rotated clockwise about the shaft 100.

The spring plate 158, the spring 168, and the crank 154 all move together with the pinch roller 94 as it moves from its fully retracted position to a position in which it first contacts the capstan 92. The mechanism moves easily up to this point, and requires little work from the solenoid. At this point, the solenoid plunger 144 has reached a position near its inner most position or its "seat". At this position it exerts much greater force for the same electrical input than it did when the plunger was extended further out of the solenoid body.

When the roller 94 contacts the capstan 92, the pinch roller 94 can move no further. This immobilizes the shaft 100 and the spring plate 158. However, the crank 154 can rotate further clockwise, and does so. This pulls the pin 164 away from the edge 162 of the spring plate, further stretching the spring, and applies a clockwise torque to the spring plate 158 through the spring 168, and thus applies an increased force on the pinch roller 94. This force increases until the crank 154 stops moving, at which point the desired amount of force has been applied to the pinch roller 94.

Still referring to FIG. 6, the other pinch roller 84 is operated by the solenoid 142 in essentially the same way as the pinch roller 94. A long connecting link 172 is pivotably connected at 170 to the crank 154. The link 172 is pivotably connected 174 to another crank member 176 which is rotatably connected to the shaft 90 to which the roller arm 86 of the pinch roller 84 is secured.

A spring plate 178 similar in shape to the spring plate 158 also is secured to the shaft 90 by a clamp 180. A second spring 188 like the spring 168 is stretched between a first pin 186 on the spring plate 178, and a second pin 184 on the crank arm 176. The pin 184 abutts against the edge 182 of the spring plate 178 until contact is made between the pinch roller 84 and the capstan 82, at which point the crank 176 continues to rotate and further stretch the spring 188 to apply its force to the pinch roller in the same way that the spring 168 applies force to the pinch roller 94.

As it is illustrated in FIGS. 5 and 6, a long, relatively weak spring 190 is connected between the pins 145 and 156 to restore the linkage to its retracted position when the solenoid 142 is de-energized. Thus, in case of a power failure, the pinch rollers automatically are retracted away from the capstans. Since the outer surface of each pinch roller is made of a relatively low-durometer plastic material, it can, under certain extreme environmental conditions, take on a permanent "set" that is, it will be dented due to the long term pressurized contact with the capstan when both parts are immobilized. Automatic retraction of the pinch rollers thus prevents damage to them.

The mechanism 138 is advantageous in that it utilizes the solenoid 142 only its most efficient and powerful mode to apply force to the pinch roller.

The foregoing is illustrated schematically in FIG. 8, which is a curve showing, qualitatively, the relationship between the distance of the plunger from the solenoid "seat", verses the force produced by the solenoid. As it can be seen, the amount of force produced increases exponentially with the reduction of the distance of the plunger from its seat.

Thus, where the solenoid does not operate efficiently, it is not required to do much work; it is required to do significant work only where it operates most efficiently—in the region where the plunger is closest to its seat.

A further unexpected advantage of this feature of the invention is that the solenoid is assisted by the inertia of its relatively massive plunger. The plunger is accelerated when the load is light, and the inertia of its movement assists in stretching the spring when the capstan is contacted.

Another advantageous feature of the pinch roller engagement mechanism 138 is that the pre-loading or pre-stressing of the springs 168 and 188 not only minimizes the work required from the solenoid when its plunger is in its outermost position, but it also allows the force applied to the pinch rollers 94 and 84 to be determined more accurately. This is illustrated by FIG. 9, which is a graph illustrating qualitatively the variation of spring force with elongation of two springs, one which is prestressed, and the other which is not. The spring which is not pre-stressed must have a high spring constant in order to reach the desired force Y within the short distance available. In contrast, the pre-stressed spring can have a much lower spring constant. The force to which it has been pre-stressed is indicated at Z. The slope of the curve of the pre-stressed spring need be only relatively modest in order to reach the desired force Y in the distance permitted.

This is advantageous in that, for a given distance moved by the mechanism, the pre-stressed spring will provide much lower error in the applied force than will the other spring. Thus, the force applied to the pinch rollers can be controlled much more accurately. This helps assure that the force is sufficient to enable the capstan to grip the tape, and is not so large that the roller and capstan bearings wear too rapidly, and/or require the use of a larger solenoid.

Another advantageous feature of the mechanism 138 is that each of the pinch rollers 184 and 94 is held against the capstan by its own separate spring 188 or 168. Thus, in contrast to certain prior mechanisms, any eccentricities in one of the pinch rollers will be absorbed by the spring associated with that pinch roller and will not be transmitted to the other pinch roller. This prevents the transmission and multiplication of such defects in the rollers, and tends minimize "wow" and "flutter" which otherwise might occur. Thus, the sound quality of the recording is enhanced.

BRAKING SYSTEM

The braking system of the present invention is illustrated in the left-center portion of FIG. 4, and in FIG. 7. FIG. 4 shows a drive motor 194 for driving a spindle 196 on which the tape reel 54 is drivably mounted. An identical motor is provided for the other tape reel, but is not shown in the drawings in order to avoid needless repetition. Each drive motor has a braking mechanism essentially the same as the one about to be described, with differences to be noted below. Again, the second braking system is not shown in order to avoid repetition.

Referring now to FIGS. 4 and 7, the brake mechanism 200 includes a brake drum 202 which is secured to the end 198 of the shaft driven by the motor 194. Wrapped around the brake drum 202 is a strap 204 made out of flexible plastic material such acetal. It is pivotably attached at one end 206 to an arm 208 of a pivotable bracket 224. The strap 204 is pivotably secured at its other end 210 to a fixed bracket 212 which is secured to a mounting plate 213 by means of screws 214 passing through elongated slots 216 in the bracket. The slots allow the position of the end 210 of the strap to be adjusted.

Referring primarily to FIG. 7, the brake actuating mechanism includes a solenoid 218 with a plunger 220 operating through connecting links 222 to rotate the bracket 224 about a pivot axis 228. A torsion spring 238 encircles the shaft 228. As is shown in FIG. 4, one end 240 of the torsion spring extends through one of the three different holes 232, 234, and 236 (see FIG. 7) in a plate 230 to act as one end stop for the torsion spring. The other end of 242 of the torsion spring 238 bears against the U shaped end 226 of the bracket 224.

When the bracket 224 is released by the solenoid, the torsion spring 238 tends to rotate the bracket 224 about the pivot 228 in a clockwise direction toward the position shown in full lines in FIG. 7. This rotation causes the end 206 of the brake strap 204 to be pulled downwardly to tighten the brake strap about the drum, thus applying a braking force due to the increased frictional contact between the strap 204 and the brake drum around which it is wrapped. Thus, the force applied by the torsion spring 258 determines the amount of the braking force.

In accordance with one of the features of the invention, the amount of the braking force can be varied simply by moving the end 240 of the spring from one to another of the three holes 232, 234 or 236. This modifies the amount of torque applied by the spring, thus making it possible to easily adjust the brake for use with magnetic tape of varying weight (e.g., wider or narrower tape), and for individual wear characteristics of the brake drum.

The other braking structure, which is not shown in the drawings, is identical to that shown in FIGS. 4 and 7, except that it is the mirror image. Since the brake structure shown tends to be uni-directional in operation: that is, it tends to apply more braking force on a brake drum rotating in one direction than in the other, one of the two brake bands will be dominant in stopping forward motion of the tape reels, and the other will be dominant in stopping reverse rotation of the tape reels.

In any event, each of the two brake structures can be adjusted separately from the other, thus providing for individual and independent adjustments of the brakes to account for differing wear characteristics. Adjustments can be made not only by moving the end 240 of the torsion spring to a different one of the three holes 232, 234, and 236, but it also can be made by adjusting the position of the other end of the brake strap by loosening the screws 214 and moving the bracket 212.

As it can be seen from the foregoing, the construction described above amply meets the objectives set forth above. The power drain of the pinch roller engagement mechanism is greatly reduced, and the power supply and solenoid size requirements are eased so as to enable the reduction of the size and cost of those items. Battery operation is facilitated.

The pinch roller engagement mechanism also tends to minimize "wow" and "flutter" due to eccentricities in the pinch rollers.

The braking system is advantageous in that each of the two brakes can be adjusted independently of the other so as to compensate for differences in their separate wear characteristics. Moreover, adjustments easily can be made, without special tools, in order to accommodate for different sizes of tape and different loads on the braking system.

Contaminants are kept out of the cabinet of the logger device, and noise emissions from the internal blower are reduced by the use of inlet ports with air filters, and a sound insulation chamber. The sound insulating material in the chamber helps keep the sound of the fan in the cabinet, and also helps keep contaminants out of the cabinet. This helps minimize "drop-outs" or loss of recordings from the tapes.

The above description of the invention is intended to be illustrative and not limiting. Various changes or modifications in the embodiments described may occur to those skilled in the art and these can be made without departing from the spirit or scope of the invention.

We claim:

1. In a communications-monitoring multi-channel magnetic tape recorder/reproducing device including a drive capstan, multi-channel recording and reproducing heads, means for rotating said drive capstan to move said tape across said heads, a pinch roller to urge said tape against said capstan with a pre-determined force, a solenoid having a plunger, a drive engagement mechanism comprising displaceable mounting means for mounting said pinch roller and to allow movement of said pinch roller towards and away from said capstan, a linkage connecting said pinch roller mounting means to said plunger so that said solenoid, acting through said linkage, moves said pinch roller from a retracted position to a contact position in which it contacts said capstan and urges said pinch roller against said capstan with said pre-determined force, said linkage including resilient bias means for applying a pre-determined force to said pinch roller in response to movement of said solenoid plunger in a given direction, and disabling means for disabling said bias means and preventing it form applying force to said pinch roller until said pinch roller is closely adjacent said capstan; and further including a second drive capstan and second pinch roller and second drive engagement mechanism operative to engage said second pinch roller with said second drive capstan in functionally the same manner as the first-named drive engagement mechanism engages the first-named pinch roller and capstan with one another; and further including a coupling member drivably coupling said linkage of said drive engagement mechanisms to enable said solenoid to operate both of said mechanisms simultaneously.

2. In a communications-monitoring multi-channel magnetic tape recorder/reproducing device including a drive capstan, multi-channel recording and reproducing heads, means for rotating said drive capstan to move said tape across said heads, a pinch roller to urge said tape against said capstan with a pre-determined force, a solenoid having a plunger, a drive engagement mechanism comprising displaceable mounting means for mounting said pinch roller to allow movement of said pinch roller towards and away from said capstan, a linkage connecting said pinch roller mounting means to said plunger so that said solenoid, acting through said linkage, moves said pinch roller from a retracted position to a contact position in which it contacts said capstan and urges said pinch roller against said capstan with said pre-determined force, said linkage including resilient bias means for applying a pre-determined force to said pinch roller in response to movement of said solenoid plunger in a given direction, and disabling means for disabling said bias means and preventing it from applying force to said pinch roller until said pinch roller is closely adjacent said capstan, wherein said resilient bias means includes a resilient member and means for pre-stressing said resilient member to provide a substantial portion of said pre-determined force; wherein said resilient member is a tension spring coupling said linkage to said pinch roller mounting means, said disabling means comprises means for holding said spring in a pre-stressed position until said pinch roller contacts said capstan, and said linkage and plunger are adapted to continue moving one end of said spring to further stress it after said pinch roller contacts said capstan; and wherein said drive engagement mechanism further comprises a supporting member, a shaft pivotably mounted on said support member, an arm secured to said shaft at a point adjacent to one end of said arm, said pinch roller being rotatably mounted adjacent to the other end of said arm, a lever arm rotatably mounted on said shaft, one end of said spring being secured to said lever arm at a point spaced from said shaft, a spring plate secured to said shaft, the other end of said spring being secured to said spring plate at a location spaced from one edge of said plate, a stop member on one of said plate and said lever arm, said stop ember being positioned to engage said plate and said lever arm so as to stretch said spring, with said spring holding said lever arm and plate together until said pinch roller reaches said capstan, at which point said lever arm continues to rotate and stretch said spring to apply said pre-determined force to said pinch roller.

3. A device as in claim 2 in which said linkage includes first and second elongated links pivotably joined together at one end, the first one of said links being pivotably mounted on said support member at its other end, said plunger being pivotably secured to said first link intermediate its ends, the second one of said links being pivotably joined adjacent to its other end to said lever arm, said first and second links being movable by said plunger between an engagement position in which the angle formed by first link with the direction of movement of said plunger is around 90° and a dis-engagement position in which said angle is substantially different from 90°, and a return spring connected between said other ends of said kinks to return them to said dis-engagement position when said solenoid is released.

4. A device as a claim 3 in which said lever arm is a crank with a portion extending beyond said shaft, said other end of said second link being pivotably connected to said portion.

5. A device as in claim 4 including another drive capstan and another pinch roller and another drive engagement mechanism operative to engage said other pinch roller with said other drive capstan in functionally the same manner as the first-named drive engagement mechanism engages the first-named pinch roller and capstan with one another, and including a third link pivotably connected between said portion of said crank and another crank forming part of the other drive engagement mechanism.

* * * * *